United States Patent [19]
Klinkner et al.

[11] 3,956,900
[45] May 18, 1976

[54] METHOD FOR CONSOLIDATING COAL AND/OR ROCK IN MINING

[75] Inventors: Hans-Guido Klinkner, St. Ingbert (Saar); Günter Culmann, Neunkirchen-Haus Furpach (Saar), Germany

[73] Assignee: Saarbergwerke Aktiengesellschaft, Saarbrucken, Germany

[22] Filed: Feb. 3, 1975

[21] Appl. No.: 546,597

[30] Foreign Application Priority Data
Feb. 4, 1974   Germany............................ 2405223

[52] U.S. Cl............................ 61/36 R; 106/287 SS; 260/DIG. 14
[51] Int. Cl.²............................................ E02D 3/14
[58] Field of Search ........................ 61/36 R, 1 R; 106/287 SS; 260/DIG. 14; 166/292; 175/72

[56] References Cited
UNITED STATES PATENTS

| | | | |
|---|---|---|---|
| 1,873,296 | 8/1932 | Cross.................................. | 144/261 |
| 2,156,220 | 4/1939 | Dunn.................................. | 166/292 |
| 3,642,509 | 2/1972 | Fujimasu ....................... | 106/287 SS |

FOREIGN PATENTS OR APPLICATIONS

| | | | |
|---|---|---|---|
| 45-24952 | 8/1970 | Japan............................ | 106/287 SS |

*Primary Examiner*—Paul R. Gilliam
*Assistant Examiner*—Alex Grosz
*Attorney, Agent, or Firm*—Larson, Taylor, and Hinds

[57] ABSTRACT

The specification describes a method for the consolidation of coal and/or rock in mines by injection of a liquid which subsequently hardens made up of magnesium chloride solution, having a specific gravity above 1.22, magnesium oxide and bentonite. Before transport the bentonite is suspended in the magnesium chloride solution and the suspension is stabilised by an agent which stiffens the consistency.

4 Claims, No Drawings

METHOD FOR CONSOLIDATING COAL AND/OR ROCK IN MINING

BACKGROUND OF INVENTION

1. Field to Which Invention Relates

The invention relates to a method for the consolidation of coal and/or rock in mining by injecting of a liquid adapted to solidify and comprising magnesium chloride solution with a specific gravity of more than 1.22, magnesium oxide and bentonite.

2. The Prior Art

Since the liquid for injection cannot, having regard to the pot life or setting time, be produced above ground and be brought in a ready condition to the position at which it is to be used, the three components, magnesium chloride solution, magnesium oxide and betonite are separately transported and are mixed only a short time before their use underground.

In this respect, however, various difficulties occur. 1 cubic meter of liquid for injection involves for example a total transport volume of 1.547 cubic meters for the three components. In this case the larger amount, for example 0.824 cubic meters, applies for the pulverulent solids magnesite and betonite, whose transport in rough conditions underground in paper bags or sacks is more difficult, particularly owing to the danger of damage, than the transport of dissolved magnesium chloride, which can be comparatively rationally carried out using tank trucks or pipelines in which the liquid is pumped. Furthermore, precise metering gives raise to problems underground.

Attempts to combine at least the betonite and the magnesium chloride solution above ground to form a single component which can then be stored and transported, have not led to success. The bentonite settles out too rapidly so that in the case of partial emptying, which cannot be avoided, of silos, intermediate containers and transport tanks the suspension is drawn off partly with an excessively low solid concentration and partly with a concentration which is too high. Stirring devices are not provided in the containers coming into question; furthermore they would be too expensive.

OBJECT OF INVENTION

One aim of the invention is to simplify the use of a liquid for injection of the above-mentioned type.

SUMMARY OF INVENTION

In accordance with the invention this is made possible by adopting the feature that before transport the bentonite is suspended in the magnesium chloride solution and the suspension is stabilised by an agent which stiffens the consistency.

Since as a result the bentonite can be added above ground to the magnesium chloride solution there is an overall reduction in the volume to be transported. The reduction — particularly required — of the solids volume is in this respect substantial. The increase in the liquid volume which must be put up with as a result is only slight and, when looked at from the transport aspect, gives rise to less problems. The metering out of the bentonite underground is not necessary.

In accordance with the particularly preferred form of the invention an acidic consistency stiffening agent is employed as for example a highly disperse form of silica, which also comprises silanol groups.

In this case there is the extremely advantageous effect that afterwards on the addition of the basic magnesium oxide the thickening action is lost again at least to a substantial degree so that the capability of being injected of the liquid obtained is not reduced.

Along these lines the increase or stiffening in consistency owing to the agent added is to be produced more as a result of thixotropic phenomena than as a result of an increase in viscosity.

The tests described in what follows are intended to provide a further explanation of the invention.

Starting material:
Commercial quality burnt magnesia:
Chemical analysis: magnesium oxide 86.4 % by weight, calcium oxide 0.98 % by weight. Bulk weight (loosely heaped): approximately 650 gram per liter.

Commercial quality magnesium chloride solution:
Chemical analysis: silicon dioxide 0.04 % by weight, iron 0.05 % by weight, calcium 0.08 % by weight, magnesium 8.30 % by weight, potassium 0.36 % by weight, sodium 0.54 % by weight, chloride 24.43 % by weight, sulfate 1.44 % by weight, water 64.78 % by weight. Specific gravity: 1.334 (concentrated solution).

Bentonite:
Bentonite flour with a total mineral content of at least 65 % by weight, proportion of montmorillonite at least 50 % by weight, amount of kaolonite and illite together at least 15 % by weight. Specific surface area 50–70 square meters/g (in accordance with B.E.T.), ionic exchange capacity 40–50 m val/100 g.

Highly dispersed silica:
Highly dispersed amorphous silica with approximately 3 silanol groups per 100 $A^2$ surface. Specific surface area 200 ± 25 square meters/g (in accordance with B.E.T.).

TEST 1

This test relates to the production of a liquid for injection as used conventionally in accordance with the prior art.

56.7 parts by weight of concentrated magnesium chloride solution are stirred up with 17.3 parts by weight of bentonite flour and following this while carrying out further stirring 26.0 parts by weight of finely ground burnt magnesite are added.

The dispersion obtained in this manner has after standing for 1 hour a residual penetration of 405.1/10 mm. (Residual penetration in accordance with DIN 51804 sheet 1 "Testing lubricants, determination of the cone penetration of lubricants with a hollow cone and a solid cone." Cone used: Plastic cone with a weight of 62.6 g including the guiding rod.) The dispersion is thixotropic and even in a resting condition is initially sufficiently freely flowing to be able to be injected into coal and/or rock without difficulties for consolidation. The dispersion hardens in 480 minutes. Moldings produced from the dispersion have after standing for 24 hours a flexural strength of 95 kp per square centimeter. These properties make the dispersion suitable for consolidation in mines.

Volumetric calculation: In the case of a specific gravity of 1.701 of the dispersion described the following will be required for 1 cubic meter:

| | |
|---|---|
| 965 kg of concentrated magnesium chloride solution with a specific gravity of 1.334 | = 0.723 cubic meter |
| 294 kg of bentonite flour with a bulk weight of 923 g/l | = 0.319 cubic meter |

-continued

| 442 kg of burnt magnesite with a bulk weight of 875 g/l | = 0.505 cubic meter |
|---|---|
| overall transport volume | = 1.547 cubic meters |

TEST 2

This test shows that a dispersion of bentonite in magnesium chloride solution with the mixing ratio in accordance with test 1 is not sufficiently capable of being stored.

56.7 parts by weight of concentrated magnesium chloride solution are stirred up with 17.3 parts by weight of bentonite flour and allowed to stand just as in test 1. The dispersion so obtained, which after standing for one hour has a residual penetration of 466.1/10 mm, separates out at the top clear magnesium chloride solution even after 24 hours of standing time to the extent of 11.6 % by vol. and to the extent of 22 % by vol. after standing for 48 hours.

TEST 3

Indicates that also a dispersion with the maximum bentonite concentration, which is just possible with a predetermined magnesium oxide quantity having a regard to the capability of being injected (51.6 parts by weight of concentrated magnesium chloride solution, 24.2 parts by weight of burnt magnesite and 24.2 parts by weight of bentonite flour) also separates out too rapidly to be stored for a sufficiently long period of time.

51.6 parts by weight of concentrated magnesium chloride solution are stirred just as in test 1 up with 24.2 parts by weight bentonite flour. The dispersion obtained, which after standing for one hour has a residual penetration of 433.1/10 mm, leaves are standing for 24 hours 1.6 % by vol. of clear magnesium chloride solution at the top, this increasing to 10 % vol. after 48 hours.

TEST 4

This test shows how a small addition of highly dispersed silica stabilises a magnesium chloride bentonite dispersion and what advantages can be obtained from this.

For the production of a liquid for injection with the same mixing ratio of magnesium chloride solution, bentonite and magnesium oxide firstly as in test 1 55.9 parts by weight of concentrated magnesium chloride solution are stirred up with 17.0 parts by weight of bentonite flour and then while further stirring are mixed with 1.5 parts by weight of highly dispersed silica. The dispersion so obtained has after standing for one hour a residual penetration of 389.1/10 mm. Even after standing for 48 hours it is not possible to see any separation out.

If 25.6 parts by weight of burnt magnesite (magnesium oxide) are stirred into this dispersion for finishing the liquid for injection, the consistency becomes more liquid again, something which represents a substantial advantage as regards the properties of the liquid as regards injection. The residual penetration of the liquid amongs to 400.1/10 mm after standing for one hour.

The hardening or setting is somewhat delayed by the addition of silica, though the strength ultimately attained is not impaired. The time for hardening amounts to 520 minutes; moldings produced from the liquid have a flexural strength of 84.5 kp per square centimeter after standing for 34 hours.

Volumes involved:

For the production of 1 cubic meter of liquid for injection ready for use 1,265 kg of the dispersion made up of magnesium chloride bentonite and silica are mixed with 435 kg of burnt magnesite. In the case of a specific gravity of the dispersion of 1.451 it is therefore necessary to transport 0.872 cubic meter of dispersion and 0.498 cubic meter of burnt magnesite (bulk weight 875 g/l). As compared with test 1 the liquid transport volume, which gives rise to less problems, is somewhat increased, but there is the great advantage that the volume of solids to be transported is decidedly reduced.

TEST 5

Indicates once again the at least substantially destruction of the thickening action of highly dispersed silica by the magnesium oxide which is added later.

66.3 parts by weight of concentrated magnesium chloride solution are stirred with 3.3 parts by weight of highly dispersed silica.

The very thixotropic dispersion has after standing for one hour a residual penetration of 328.1/10 mm. After 48 hours no clear magnesium chloride solution segragates. If 30.4 parts by weight of magnesium oxide are added while stirring to the dispersion, the mixture becomes relatively free-flowing: after standing for one hour it has a residual penetration of 391.1/10 mm.

For consolidation in mines the liquid is less suitable since it hardens to sloowly owing to the absence of added bentonite.

TEST 6

This test shows that the method in accordance with the invention can also be employed in the case of the use of activated bentonite.

57.96 parts by weight of concentrated magnesium chloride solution are mixed by stirring with 15.0 parts by weight of activated bentonite, which is characterised more especially by the comlete replacement of the Ca and Mg ions capable of being exchanged, by Na ions, and 0.5 parts by weight of highly dispersed silica.

As a result a comparatively freely flowing liquid is obtained which is, however, highly thixotropic and is stable for several days, the residual penetration is 408.1/10 mm after one hour or standing. If 26.54 parts by weight of commercial grade burnt magnesite (1600 MS) are stirred into this dispersion, the result is a liquid for injection which is also very thixotropic and which after standing for one hour has a residual penetration of 350.1/10 mm.

The dispersion hardens in 560 minutes. Moldings produced from the dispersion have after standing for 24 hours a flexural strength of 70 kp per square centimeter. The dispersion is suitable for consolidating rock in mines.

It is to be pointed out in this respect that the penetration data can only be regarded as applying to or indicating the capability of being injected with considerable limitations. The penetration figure last given of 350.1/10 mm for example is comparatively speaking very low; the liquid concerned is, however, so freely flowing when moved that it can readily be injected. The penetration data are accordingly mainly measured having regard to the capability of being pumped.

What we claim is:

1. In a process for the consolidation of coal and/or rock in mines by the injection therein of a solidifiable mixture comprising bentonite, magnesium chloride having a specific gravity of more than 1.22 and magnesium oxide, the improvement comprising preparing in advance of use a suspension of said bentonite in said magnesium chloride, stabilizing said suspension with an acid thickening agent, and adding to said stabilized thickened suspension said magnesium oxide at the time of use so that the mixture hardens.

2. The improvement of claim 1 wherein the acidic thickening agent is highly dispersed silica.

3. The improvement of claim 1 wherein the silica is used in an amount of 0.1 to 6 parts by weight per 100 parts by weight of said magnesium chloride solution.

4. The improvement of claim 1 wherein the bentonite is suspended in the magnesium chloride solution above ground.

* * * * *